United States Patent

Katsuro et al.

[11] Patent Number: 6,129,899
[45] Date of Patent: Oct. 10, 2000

[54] PROCESSES FOR PRODUCING SYNTHETIC QUARTZ POWDER AND PRODUCING SHAPED QUARTZ GLASS

[75] Inventors: Yoshio Katsuro; Masaru Shimoyama, both of Kitakyushu; Hiroshi Maeda, Sunayama Hasaki-machi; Shoji Oishi, Kitakyushu, all of Japan

[73] Assignee: Mitsubishi Chemical Corporation, Tokyo, Japan

[21] Appl. No.: 08/945,318

[22] PCT Filed: Apr. 26, 1996

[86] PCT No.: PCT/JP96/01176

§ 371 Date: Nov. 26, 1997

§ 102(e) Date: Nov. 26, 1997

[87] PCT Pub. No.: WO96/33950

PCT Pub. Date: Oct. 31, 1996

[30] Foreign Application Priority Data

| Apr. 28, 1995 | [JP] | Japan | 7-105888 |
| Apr. 28, 1995 | [JP] | Japan | 7-105889 |
| Sep. 29, 1995 | [JP] | Japan | 7-252456 |
| Sep. 29, 1995 | [JP] | Japan | 7-252457 |
| Sep. 29, 1995 | [JP] | Japan | 7-252458 |

[51] Int. Cl.[7] .................................................. C10B 33/12
[52] U.S. Cl. ........................... 423/338; 423/335; 501/54; 65/17.2; 65/33.1; 65/440
[58] Field of Search ...................... 423/335, 338; 501/54; 65/17.2, 33.1, 440

[56] References Cited

U.S. PATENT DOCUMENTS

| 5,030,433 | 7/1991 | Mehrotra | 423/335 |
| 5,145,510 | 9/1992 | Saito et al. | |
| 5,516,350 | 5/1996 | Onoda et al. | 65/17.2 |
| 5,683,483 | 11/1997 | Yosiaki et al. | 501/54 |
| 5,979,186 | 11/1999 | Koppler et al. | 501/54 |

FOREIGN PATENT DOCUMENTS

| 0 486 004 | 5/1992 | European Pat. Off. |
| 0 801 026 | 10/1997 | European Pat. Off. |

OTHER PUBLICATIONS

Database WPI, Derwent Publications, AN 83–830481, JP 58 181 735, Oct. 24, 1983.

*Primary Examiner*—Tom Dunn
*Attorney, Agent, or Firm*—Oblon, Spivak, McClelland, Maier & Neustadt, P.C.

[57] ABSTRACT

A process for producing a synthetic quartz powder, which comprises a step of heat-treating a silica gel powder while permitting it to flow in a rotary kiln.

16 Claims, 2 Drawing Sheets

PROCESSES FOR PRODUCING SYNTHETIC QUARTZ POWDER AND PRODUCING SHAPED QUARTZ GLASS

This Application is a 371 of PCT/JP96/01176, filed Apr. 26, 1996.

TECHNICAL FIELD

The present invention relates to efficient processes for producing a synthetic quartz powder and a shaped product of quartz glass.

BACKGROUND ART

In recent years, for glass products to be used in the field of optical communication or in the semiconductor industry, a very strict control has been carried out with respect to minor impurities and fine bubbles in the products. Such high quality glass is produced mainly by e.g. (1) a method for purifying natural quartz, (2) a method wherein a fume formed by decomposition of silicon tetrachloride in an oxyhydrogen flame is deposited and grown on a substrate, or (3) a method wherein a silica gel obtained by hydrolysis and gelation of a silicon alkoxide or the like, is baked to obtain a synthetic quartz powder, and such a quartz powder is fused to obtain a shaped product.

However, the method (1) has a problem that there is a limit in reduction of the content of minor impurities, and the method (2) has a problem that the production cost is extremely high. On the other hand, the method (3) of baking a silica gel does not necessarily satisfy the required level, although as compared with the method (2), it is possible to obtain a synthetic quartz powder having a low content of minor impurities at a low cost. Besides, this method has a problem that fine bubbles may sometimes form in the shaped product as the final product, and such fine bubbles tend to cause various troubles.

The present inventors have conducted extensive studies to find out a solution to the problem in the above method (3) for producing a synthetic quartz powder by baking a silica gel, i.e. to find out a method for producing a synthetic quartz powder whereby formation of fine bubbles in a shaped product obtainable by fusing it is very little, and a method for carrying out such production industrially advantageously, and the following points have been made clear. Namely, baking of a silica gel is carried out by charging a silica gel into a quartz container in order to avoid contamination of impurities from the container and heating it in e.g. an electric furnace. Especially for industrial production, a quartz crucible having a large diameter or the like is used. However, a silica gel has a low bulk density as compared with the quartz powder, and accordingly, the container used for baking can not effectively be utilized, whereby the productivity is poor, and the production cost is high. Accordingly, to improve the productivity, it is important to increase the bulk density of the powder to be charged into the crucible.

On the other hand, in the production of a shaped product employing a quartz powder, formation of fine bubbles during the production of the shaped product, is influenced by the temperature-raising process in the baking step for the production of the quartz powder. In the silica gel powder obtained by hydrolysis of a silicon alkoxide, unreacted alkoxy groups and a part of an alcohol formed by a side reaction will remain even if the alcohol formed by a side reaction has been removed by drying. In fact, when the carbon concentration in the silica gel powder dried, is measured, it is from 1 to 3%, although it varies depending upon the drying condition. If this silica gel powder is baked in an oxygen-containing gas, the majority of carbon can be removed by combustion during the temperature-raising process. However, a part thereof may sometimes be included in the synthetic quartz powder as non-combustion carbon. If this synthetic quartz powder containing such non-combustion carbon, is used, CO or $CO_2$ gas will be formed during melt-forming, which causes formation of bubbles. Accordingly, it is necessary to remove substantially the entire amount of non-combustion carbon before the pores of the silica gel be closed, and the temperature-raising speed in the temperature-raising process becomes important.

However, as mentioned above, when industrial production of a synthetic quartz powder is intended, a quartz crucible having a large diameter is required, and the temperature in the crucible during the temperature-raising process tends to be non-uniform, and it is difficult to raise the temperature over the entire portion in the crucible at a predetermined temperature pattern. As a result, in some cases, a synthetic quartz powder containing residual carbon is likely to partially form, and fine bubbles are likely to form in a shaped product prepared by using such a synthetic quartz powder.

The present inventors have tried heating by means of a rotary cylindrical heating apparatus, a so-called rotary kiln, in order to form a synthetic quartz powder of good quality efficiently by solving such a problem. However, for the purpose of avoiding contamination, the material of the core barrel is limited to quartz or the like, whereby there has been a problem that the useful life of the core barrel tends to be short due to the heat shock by repetition of the temperature-raising step in the heat treatment. Further, a large amount of gas is generated from the silica gel by the heat treatment, and the amount of the gas generated, changes with time, whereby the waste gas treatment is difficult by the rotary kiln, and to meet with the peak in the generation of gas, the apparatus is obliged to be of a large size, and the generated gas may sometimes blow off the inner silica gel powder.

Further, in order to adequately and precisely carry out removal of the solvent, attached water, residual organic groups, etc. in the step of gradually closing the pores of the silica gel to obtain the desired synthetic quartz powder of high quality, it is necessary to strictly control the conditions for heat treatment, especially the temperature-raising step, and it is difficult to carry out such a strict control by a rotary kiln charged with a large amount of a powder. Further, there has been a problem that variation in the heating intensity is likely to occur in the axial direction of the rotary kiln, which leads to non-uniformity of the product.

Further, prevention of contamination during supply and withdrawal of the powder and unifying the quality of every batch, have not adequately be accomplished.

DISCLOSURE OF THE INVENTION

In view of the above problems, the present inventors have further conducted extensive studies and as a result, have found that a powder obtained by heat-treating silica gel by proper conditions and operation can be made to have a bulk density which is equal to a quartz powder after baking, and it can be made to have one having alkoxy groups and hydroxyl groups adequately removed, so that such a powder is suitable for baking at a higher temperature, and by such a heat-treating method, the space, the manpower and the amount of gas supplied for heating required for the production of a synthetic quartz powder, can be reduced, further aeration during heating can readily be carried out, and the productivity can be substantially improved, and thus the present invention has been accomplished. Namely, the present invention resides in a process for producing a synthetic quartz powder, which comprises a step of heat-treating a silica gel powder while permitting it to flow in a rotary kiln, and a shaped product of glass prepared by melt-forming the obtained synthetic quartz powder.

BRIEF DESCRIPTION OF THE DRAWINGS

In FIGS. 1 to 3, 1 indicates a powder, 2 a core barrel, 3 a contact surface with the powder, 4 a space in the core barrel, 5 a powder surface, 6 a dry gel hopper, 7 a table feeder, 8 a core barrel, 9 a supply inlet, 10 a doughnut-shaped dam at the inlet, 11 an air supply pipe, 12 a discharge outlet, 13 a doughnut-shaped dam at the outlet, 14 is a receptacle for heat treated powder, 15 a first heater, 16 a second heater, 17 a third heater, 18 a fourth heater, 19 a fifth heater, 20 a dry silica gel powder.

DETAILED DESCRIPTION OF THE INVENTION

Now, the present invention will be described in detail.

Preparation of a silica gel powder

A synthetic quartz powder as an object of the present invention is a synthetic quartz powder prepared by heating a silica gel powder obtainable by e.g. hydrolysis and gelation of an alkoxysilane or the like to be non-porous. The method for producing a silica gel powder is not particularly limited, and various conventional techniques may be employed. However, a technique by a so-called sol-gel method based on hydrolysis and gelation of an alkoxysilane or the like, is preferred from such a viewpoint that a high purity can readily be accomplished. The hydrolysis of an alkoxysilane by the sol-gel method is carried out by reacting an alkoxysilane with water in accordance with a known method. The alkoxysilane to be used as the starting material may be any alkoxysilane so long as it can be hydrolyzed and gelled. However, an alkoxysilane which is a $C_1$ to $C_4$ lower alkoxysilane and which contains substantially no Si—C bond by a hydrocarbon group directly bonded to silicon, such as tetramethoxysilane or tetraethoxysilane, or an oligomer thereof, is suitable for use.

The amount of water to be used, is selected usually within a range of from one equivalent to 10 equivalents of the alkoxy groups in the alkoxysilane. At that time, an organic solvent such as an alcohol or ether which is compatible with water, may be used as mixed, as the case requires. Typical examples of the alcohol to be used, include low aliphatic alcohols such as methanol and ethanol.

For this hydrolytic reaction, an acid such as hydrochloric acid or acetic acid, or an alkali such as ammonia, may be added as a catalyst. Of course, all of substances introduced into the reaction system such as water and the catalyst to be used here, shall be of high purity. The gelation of the hydrolyzed product can be carried out under heating or at room temperature. By heating, the speed of gelation can be improved, and by adjusting the degree of heating, it is possible to adjust the gelation time.

The obtained gel is a wet silica gel containing a large amount of water and an alcohol formed by the hydrolysis, and it may be pulverized and then dried, or it may be dried and then pulverized. In any case, pulverization is carried out so that the particle size of a dry silica gel obtained by drying, will be from 10 to 1,000 µm, preferably from 100 to 600 µm.

It is efficient to conduct the drying while heating under atmospheric pressure or reduced pressure. The heating temperature may vary depending upon the conditions, but is usually from 50 to 200° C. Further, the operation can be carried out by either a batch system or a continuous system. With respect to the degree of drying, it is carried out usually until the liquid content becomes from 1 to 30 wt %. Here, the liquid content is a weight reduction when a constant weight has been reached at 160° C.

Heat treatment of the silica gel powder

Figure 1:
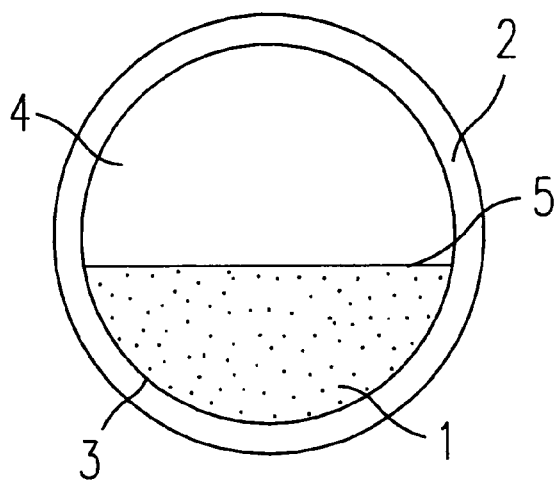
FIG. 1 is a cross-sectional view of a rotary kiln in a stationary state, to which a powder is charged.
Figure 2:
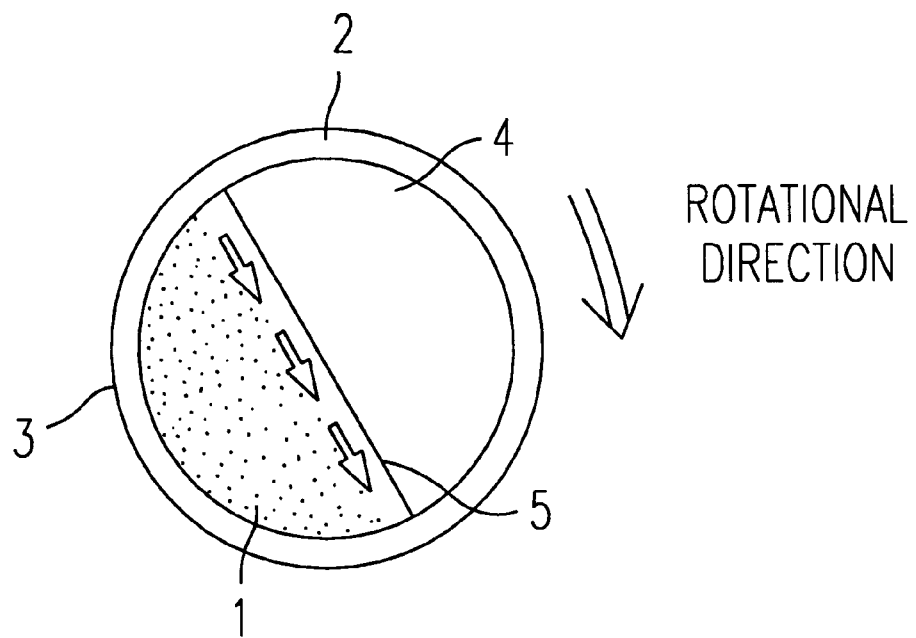
FIG. 2 is a cross-sectional view of a rotary kiln in a rotating state, in which the charged powder is in a flowing state.

In the present invention, the silica gel powder thus obtained, is subjected to heat treatment under the following specific conditions. Namely, the heat treatment is carried out while permitting the powder to flow in the rotary kiln. Here, for the powder to "flow" in the present invention is meant for a state wherein, as explained with reference to FIG. 2 showing a cross-section of a rotary kiln in a rotating state in which a powder is charged, in comparison with FIG. 1 showing a cross-section of the rotary kiln in a stationary state, no substantial slippage takes place between the powder (1) and the contact surface (3) with the powder, of the wall of the core barrel (2), and as the core barrel (2) rotates, the powder (1) is raised by the wall of the core barrel (2), and at an angle exceeding the angle of repose, the powder (1) will depart from the wall and flow down towards a lower portion of the barrel wall (in the direction of the black arrows in FIG. 2). As will be described below, it is readily possible to accomplish such a flow state of the silica gel powder constantly in the rotary kiln, by maintaining the maximum layer height of the silica gel powder to be at least 75 mm.

The material of the core barrel of the rotary kiln is required to be selected so that no contamination of the material to the treated powder will occur, and the one made of quartz is particularly preferred. In the case of one made of quartz, there is a limit in the size of the core barrel from the fabrication difficulty. Accordingly, depending upon the conditions, a plural (multi-stage) rotary kiln may be employed for the heat treatment. When a core barrel made of quartz is employed, if the maximum layer height of the powder is low, the powder in the core barrel may sometimes slip, whereby the powder will not flow, although the cause has not yet been clearly understood. Accordingly, it has been found by an extensive study by the present inventors that it is possible to obtain the flow state of the powder constantly by carrying out the heat treatment while maintaining the maximum layer height of the powder flowing in the rotary kiln to be at least 75 mm, although the reason is not clearly understood.

Here, the maximum layer height means the maximum distance when a vertical line is drawn from the powder surface (5) where the powder (1) contacts the space (4) in the core barrel, in the direction towards the contact surface (3) with the powder, of the core barrel.

The barrel diameter of the rotary kiln is not particularly limited. However, as a result of a study made by the present inventors on rotary kilns having various barrel diameters, it has been found that when the inner diameter of the barrel is at least 100 mm, the effects of the present invention are especially remarkable, and it is preferably at least 120 mm, more preferably at least 150 mm. Further, the maximum diameter is not particularly limited, but the inner diameter of the barrel is usually at most 600 mm, more preferably at most 500 mm, from the viewpoint of its structure and uniformity in mixing and heating. In the case of 150 mm or less, it is necessary to provide special inserting and discharging mechanisms at the respective barrel ends.

The present inventors have found that if the maximum layer height is lower than 75 mm, the flowability of the powder in the core barrel tends to be poor, and flow of the powder tends to be intermittent, whereas when it is at least 75 mm, the powder in the core barrel flows continuously. If the flow is intermittent, local heating is likely to occur at the wall surface of the core barrel, and if flow starts, steam or methanol will abruptly be generated, whereby it tends to be difficult to conduct the operation constantly.

The operation can be carried out by either a batch method wherein the dried silica gel powder is preliminarily charged into the core barrel of the rotary kiln so that the maximum layer height is at least 75 mm, followed by heat treatment, or a continuous method wherein heat treatment is carried out while adjusting the amount of the powder in the core barrel so that the maximum layer height is at least 75 mm, and the treated powder is continuously discharged from the core barrel. However, the latter method is preferred from the viewpoint of the economical efficiency and the operation efficiency.

Especially in the case of the continuous method, if the flow becomes intermittent, the discharge of the powder from the core barrel will be intermittent, whereby a constant operation can not be carried out. Therefore, the continuous flow of the powder is essential.

Temperature for heat treatment

The temperature range for the heat treatment is from 50 to 1,100° C. The heating can be carried out by heaters or the like.

By the heat treatment, firstly, water and an alcohol contained in the silica gel will evaporate. At that time, the temperature of the powder in the rotary kiln is usually from 50 to 300° C.

Within this temperature range, the amount of gas generated from the powder is preferably at most 500 N-l/kg.hr. If the amount of generation is higher than 500 N-l/kg.hr, a bumping phenomenon may occur in the powder, whereby the flowability of the powder may be lost. The reason is not clearly understood, but it is considered that a large amount of a volatile component is formed by bumping so as to lift the powder, whereby the friction at the wall surface decreases, and the powder tends to be hardly raised by the wall of the core barrel.

Then, the temperature is raised to a combustion temperature range of the residual carbon component. This temperature range is from 300 to 600° C. However, by a study by the present inventors, it has been found that the flowability of the powder in the rotary kiln tends to be very poor, if the heating for combustion of the residual carbon component is carried out in a rotary kiln at a temperature of from 300 to 430° C. Accordingly, combustion of the residual carbon component is carried out at a temperature of at least 450° C.

However, when this heat treatment is actually carried out while continuously supplying the powder from one end of the rotary kiln and permitting it to flow, naturally, there will be the corresponding temperature zone of from 300 to 430° C. during the temperature-raising process. It is advisable to adjust heat supply so that the length of this temperature zone will be at least 5 cm and at most 135 cm. If the length of the temperature zone is longer than 135 cm, there will be a portion where the flowability of the powder tends to be poor.

On the other hand, if it is less than 5 cm, it will be required to carry out intense heating within a very narrow range, although there will be no portion where the flowability will be poor.

The reason as to why the flowability of the powder decreases within this temperature range of from 300 to 430° C., is not clearly understood. However, it is considered that (1) in this temperature range, the bulk density of the silica gel decreases, and (2) the silica gel within this temperature range has a physical nature such that it is likely to have static electricity, whereby the friction at the wall surface may decrease, and the powder tends to be hardly raised by the wall of the core barrel.

In the powder heated in the temperature range of at least 450° C., decrease of the residual carbon proceeds. When the powder temperature becomes at least 600° C., pore closing of the silica gel starts. Accordingly, before this temperature range is reached, substantially all of the residual carbon must be burnt off. Otherwise, non-combustion carbon will remain in the resulting synthetic quartz powder, whereby bubbles will form during melt-forming.

Accordingly, it is necessary to properly control the time for the powder to pass through the temperature range of from 450 to 550° C. In the case of a continuous method, the powder in the rotary kiln can be moved in a substantially piston flow fashion in the travelling direction. Accordingly, the time for passing through the predetermined temperature zone can be determined from the length of the predetermined temperature zone in the rotary kiln and the moving speed of the powder in the travelling direction. For example, when the length of the predetermined temperature zone is 1 m, and the moving speed of the powder in the travelling direction is 0.5 m/hr, the passing time will be 2 hours.

The passing time is suitably from 0.5 to 10 hours, preferably from 1 to 5 hours. If it is shorter than this range, it tends to be very difficult to reduce non-combustion carbon sufficiently, and if it is longer than this range, no difference will be observed in the amount of non-combustion carbon, and the apparatus will have to be of a large size, such being uneconomical.

The temperature-raising speed in the range where removal of residual carbon in the silica gel, proceeds, is at most 1,000° C./hr, preferably at most 500° C./hr. It is also effective to maintain the temperature within a range of from 400 to 600° C. for from 0.5 to 5 hours.

The heat treatment is carried out in clean air or in an oxygen-containing gas atmosphere. Specifically, a method may be adopted wherein clean air or an oxygen-containing gas is supplied from one end of the core barrel and it is discharged from the other end. The amount of the gas to be supplied is usually from 10 to 100 l/hr as calculated as oxygen per 1 kg of the powder in the case of a batch method, or from 30 to 300 l/hr as calculated as oxygen per 1 kg of the powder supplied continuously in the case of the continuous method. In the present invention, the heat treatment is carried out while maintaining the maximum layer height of the silica gel powder flowing in the rotary kiln to be at least 75 mm. By carrying out the heat treatment by means of a rotary kiln and by maintaining the maximum layer height to be at least 75 mm and permitting the silica gel powder to flow continuously, decrease of carbon is promoted, and a uniform treated powder can be obtained.

Method for controlling the heat treatment

Now, a method for controlling the above-described heat treatment, will be described.

In a case where such an operation is carried out in a batch system, while rotating the core barrel, the entirety is directly or indirectly heated from the exterior, and treatment is carried out by increasing the heat intensity as the time passes. On the other hand, in a case where the operation is carried out continuously, the heating zone of the core barrel is divided into a plurality of zones in the travelling direction of the powder to be treated, and the heating intensity of a heater in each zone is adjusted so that the temperature of the powder will be within a predetermined range.

Otherwise, it is possible to employ a method wherein the heating temperature is controlled so that the temperature of the powder will increase with a predetermined gradient in the direction of the flow of the powder to be treated.

Specifically, a method is adopted wherein clean air or an oxygen-containing gas is supplied from one end of the core barrel, and it is discharged from the other end. The amount of the gas to be supplied, is usually from 30 to 300 l/hr as calculated as oxygen per 1 kg of the powder which is supplied continuously. By carrying out the treatment using a rotary kiln while permitting the powder to flow, decrease of carbon is promoted, and a uniform treated powder can be obtained.

By the above heat treatment, the carbon concentration in the silica gel will be decreased to a level of from 50 to 1,000 ppm.

The treated powder having residual carbon substantially vanished, will continuously be heated, and the final temperature of the powder will be raised to a level of from 900 to 1,100° C., preferably from 950 to 1,050° C. The temperature-raising speed at that time is usually from 100 to 1,000° C./hr. As mentioned above, in the rotary kiln, the powder can be permitted to flow substantially in a piston flow fashion in the travelling direction, and the supplied powder is gradually heated as it moves in the travelling direction in the rotary kiln. Accordingly, the temperature-raising speed of the powder can be obtained from the temperature distribution within the rotary kiln and the moving speed of the powder in the travelling direction. For example, if the temperature difference is 200° C. for a distance between the temperature measuring points of 1 m, and the moving speed of the powder in the travelling direction is 0.5 m/hr, the temperature-raising speed will be 400° C./hr.

Also the heat treatment in this temperature range is carried out in clean air or an oxygen-containing gas atmosphere. Specifically, a method is adopted wherein clean air or an oxygen-containing gas is supplied from one end of the core barrel, and it is discharged from the other end. The amount of the gas to be supplied is usually from 3 to 50 l/hr as calculated as oxygen per 1 kg of the powder which is supplied continuously. Further, also the heat treatment in this temperature range is preferably carried out by means of a rotary kiln while permitting the powder to flow. Accordingly, it is advisable to carry out the heat treatment while maintaining the maximum layer height of the powder to be at least 75 mm.

By carrying out the treatment by means of a rotary kiln while permitting the powder to flow, uniform heating can be carried out, and a uniform treated powder can be obtained. By this treatment, sealing of the silica gel will substantially be completed, and the tap bulk density (hereinafter referred to simply as a bulk density) of the powder which was at a level of from 0.7 to 0.8 g/ml, increases to a level of from 1.0 to 1.2 g/ml.

In a case where such an operation is carried out in a batch system, while rotating the core barrel, the entire barrel is directly or indirectly heated from the exterior, and treatment is carried out by increasing the heating intensity as the time passes. On the other hand, if the operation is carried out continuously, a method may be adopted in which the heating zone of the core barrel is divided into a plurality of zones, and the heating temperature is controlled so that the temperature of the powder increases with a predetermined gradient in the direction of flow of the powder to be treated.

Also the heat treatment in this temperature range is preferably carried out while continuously supplying the silica gel powder from one end of the rotary kiln.

Further, as a result of a study by the present inventors, it is advisable that the angle of inclination of the rotary kiln during the above heat treatment, is at most 3°, preferably at most 1°. The silica gel powder to be treated is prevented effectively from back mixing in the axial direction of the rotary kiln by setting the angle of inclination within this range.

Mode of the heat treatment by a continuous method

In the case of a continuous method, the heat treatment can be carried out by using a plurality of rotary kilns in a series. At that time, each rotary kiln is adjusted so that the maximum layer height of the powder will be at least 75 mm.

Further, the number of rotations of the rotary kiln is not particularly limited and may be suitably selected within a practical range. Specifically, it is from 1 to 20 rpm, preferably from 3 to 10 rpm. In the heat treatment by a continuous method, it is preferred to employ a mode in which the heat treatment is carried out while continuously supplying the silica gel powder from one end of the rotary kiln.

Namely, while supplying the dry silica gel continuously from one end of the core barrel of a rotary kiln, the heat treatment is carried out in the core barrel, and the treated powder is continuously discharged from the core barrel.

To carry out such an operation continuously, it is necessary that the heating zone of the core barrel is divided into a plurality of zones, and the heating intensity is controlled so that the temperature of the powder increases with a predetermined gradient in the travelling direction of the powder to be treated. The supplied powder is gradually heated as it moves in the travelling direction in the rotary kiln. Accordingly, the temperature-raising speed of the powder can be determined from the temperature distribution in the rotary kiln and the moving speed of the powder in the travelling direction. For example, if the temperature difference is 200° C. for a distance between the temperature measuring points of 1 m, and the moving speed of the powder in the travelling direction is 0.5 m/hr, the temperature-raising speed will be 400° C./hr.

The temperature-raising speed in the range wherein removal of residual carbon in the silica gel proceeds, is suitably at most 1,000° C./hr, preferably at least 500° C./hr. Further, it is also effective to provide a zone wherein there is no temperature change within a range of from 400 to 600° C., particularly from 450 to 600° C., and to set the time for passing the zone to be from 0.5 to 5 hours. For example, it is possible to control the heating intensity in the axial direction by dividing the heater into a plurality of heaters in the axial direction of the rotary kiln. In this case, it is advisable that the heating intensity is relatively intensified from about room temperature to the temperature where water evaporates and in a temperature range where water evaporates, so that the zone range will be narrow. Then, in the temperature range where the temperature of the powder is raised by supplying a heat corresponding to the sensible heat of silica gel, it is advisable to control the heating so that the temperature of the powder gradually increases without conducting extreme heating.

On the other hand, it is advisable to control the supply speed of the silica gel powder to the rotary kiln to be constant. If the heat treating conditions of the powder are not constant, there will be variation in the quality of the resulting treated powders. Therefore, it is advisable to control the supply speed to be constant. For this purpose, it is advisable to carry out the supply by a quantitative apparatus such as a table feeder, a rotary valve or a choke valve.

As described above, the atmosphere for the heat treatment is in clean air or an oxygen-containing gas atmosphere. Specifically, a method may be adopted in which clean air or an oxygen-containing gas is supplied from one end of the core barrel, and it is discharged from the other end. The method for supplying the gas is not particularly limited. However, in the heat treatment within a range where water contained in the silica gel evaporates, it is advisable to supply the gas from the same one end as the silica gel powder and to discharge them from the other end. The temperature of one end where the powder is supplied, is close to room temperature, and if counter-currently supplied, steam is likely to condense in the vicinity of the supply inlet of the powder, whereby the powder tends to be blocked, and the flowability tends to be poor. When the supply of gas is conducted by a nozzle or the like, it is advisable that the gas supply nozzle is provided above the powder supply nozzle, and the nozzle direction is set to be horizontal with the axis of the core barrel or upward. Because, if at the same time, the supply nozzle of the powder is set to be horizontal with the axis of the core barrel or downward, short pass of the powder in the core barrel can be prevented. It is advisable that the linear velocity of the supplied gas in the core barrel is set to be at most 1 m/s, preferably at most 0.5 m/s, so as to prevent swirling of the tumbling powder, resulting in short pass through the gas layer.

The treated powder after the heat treatment is discharged from the core barrel together with the supplied gas. Accordingly, separation between the treated powder and the supplied gas is carried out. For this purpose, it is advisable to design a separator such as a cyclone so that the linear velocity of the gas will be at most 1 m/s, preferably at most 0.5 m/s, and thereby to prevent decrease of the yield as a result that a part of the treated powder is taken in the exhaust gas. Further, to prevent contamination to the product, it is preferred that the supply gas is preliminarily purified. It is particularly preferred to pass it through a filter which is capable of eliminating at most 0.02 um.

The amount of the gas to be supplied is usually from 30 to 300 l/hr as calculated as oxygen per 1 kg of the powder which is continuously supplied. Further, to realize the heat treatment of silica gel by such a continuous operation, in the present invention, it is preferred to conduct the treatment by setting the angle of inclination of the rotary kiln to be at most 3°, preferably at most 1°. Surprisingly, it has been found that in the heat treatment of the silica gel powder, even when the angle of inclination is substantially 0°, i.e. substantially horizontal, there is no trouble in the heat treatment, and such is rather desirable. In such a case, it is advisable that a doughnut-shaped dam or the like is provided to make the diameter of the supply inlet smaller than the diameter of the discharge outlet. If the angle of inclination of the rotary kiln exceeds 3°, the silica gel subjected to heat treatment may sometimes cause back flow. Namely, the silica gel will not move in a piston flow fashion in the travelling direction in the rotary kiln. In such a case, upper slippage of the silica gel, short cut and cold of silica gel caused thereby, are likely to result.

By the above-mentioned mode, a substantially steady state can be established at each point of the rotary kiln. Namely, the physical property of the treated powder at each point does not change against time, and the physical properties will be a function in the axial direction of the rotary kiln. And, the above-mentioned object of the present invention can be accomplished.

Baking

By applying heat treatment to the silica gel powder in accordance with the present invention, a synthetic quartz powder can be obtained. However, usually, silanol remains in an amount of at least 1,000 ppm. Therefore, it is usual to conduct baking at a further higher temperature range.

As the container to be used for baking, a crucible made of a material which is free from contamination of impurities to the synthetic quartz powder, such as quartz, is used. In this baking, carbon in the powder subjected to baking has already been removed substantially in its entire amount, and it is unnecessary to pay any special attention to the temperature raising speed. Accordingly, fluctuation in the temperature raising speed in the container will not present an influence over the quality, whereby a uniform product can be obtained, and it is possible to use a container of a large capacity as compared with a conventional method. Further, the bulk density of the powder is preliminarily sufficiently increased, and there will be no substantial change between the bulk density of the powder before baking and the bulk density of the powder after baking, whereby the container can efficiently be utilized, and it is possible to improve the productivity.

The baking temperature is usually from 1,100 to 1,300° C. The temperature-raising speed is not particularly limited, and can be suitably selected within a range of from 100 to 2,000° C./hr. The baking time varies depending upon the baking temperature, but usually is from 10 to 100 hours, and the baking is continued until the silanol concentration in the synthetic quartz will be not more than 100 ppm, preferably not more than 60 ppm. Further, it is preferred to carry out the heating while supplying air or an inert gas containing substantially no water, so that the decreasing rate of silanol groups will be accelerated. Of course, substantially no carbon will be present in the synthetic quartz powder after baking.

The synthetic quartz powder thus obtained may be formed into a shaped product. The shaping method varies depending upon the particular application of the shaped product. For example, when it is applied to a crucible, an arc melt method may be used, and when it is applied to a jig for IC, a method of once shaping it into an ingot by a Verneuil's method by means of oxyhydrogen flame, or a fusion method comprising heat fusion under vacuum by means of a casting mold made of carbon, may, for example, be mentioned.

In any case, by employing the synthetic quartz powder obtained by the present invention, it is possible to obtain a shaped product having little bubbles formed therein, and thus the quality of the shaped product and the product yield will be substantially improved.

EXAMPLES

Now, the present invention will be described in further detail with reference to Examples.

Example 1

Preparation of a dry silica gel powder

High purity tetramethoxysilane was reacted to obtain a bulky silica gel having a water content of at least 30 wt % (hereinafter referred to as a "wet silica gel"). This bulky wet silica gel was pulverized by a net type pulverizer and then heat-dried under reduced pressure to obtain a powdery dry silica gel. This powdery dry silica gel was classified by a vibrating sieve to obtain a powder of from 50 to 100 μm. This dry gel after classification (hereinafter referred to as a "dry silica gel powder") was analyzed, whereby the water content was 19.5 wt %, and the carbon concentration was 1.1 wt %. Further, the bulk density of this powder was 0.92 g/ml.

Heat treatment

Figure 3:
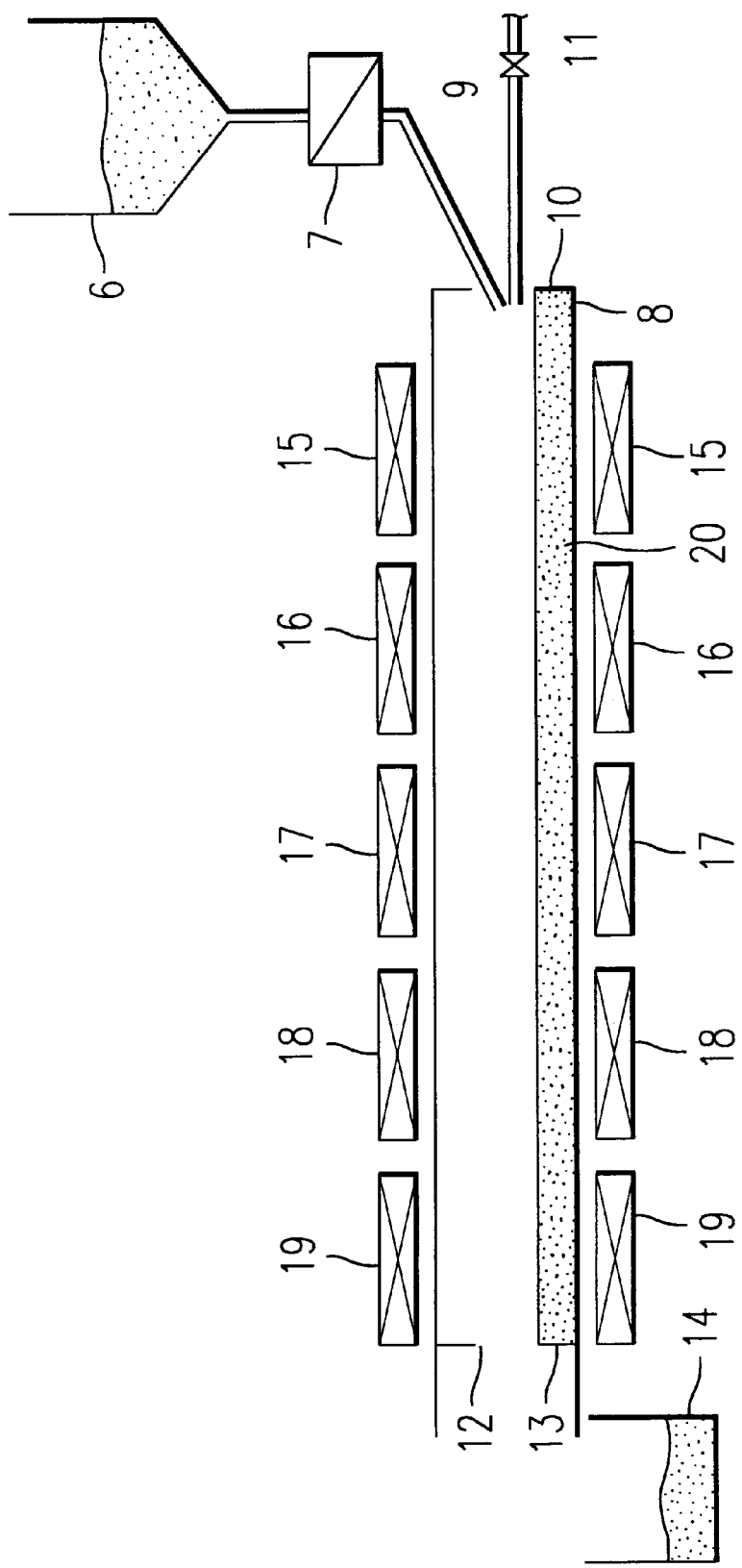
FIG. 3 is a view illustrating an example of the rotary kiln which can be used in the present invention.

Using the dry silica gel powder thus obtained, heat treatment was carried out by means of a rotary kiln as shown in FIG. 3.

The core barrel (3) was made of quartz and had a size such that the length of the heating zone was 2 m, the inner diameter was 200 mm, the doughnut-shaped dam opening diameter at the inlet was 40 mm and the doughnut-shaped opening diameter at the discharge outlet was 40 mm. Further, the core barrel was adjusted so that its angle of inclination was 0.5°.

Firstly, each heater was heated to 500° C., and heat treatment was carried out by supplying the dry silica gel powder at a rate of 6.2 kg/hr and air at a rate of 4,500 l/hr from the supply inlet, while rotating the core barrel at 4 rpm. The powders discharged upon expiration of 4, 6 and 8 hours after initiation of the supply operation, were analyzed and found to have the values shown in Table 1. The residual carbon concentration is one obtained by melting the sample powder together with a flux by means of "EMIA610 CS analyzer" manufactured by Horiba and quantitatively analyzing $CO_2$ thereby generated by a ultraviolet absorption method (one generated in the form of CO was all converted to $CO_2$ by a catalyst and then quantitatively analyzed).

TABLE 1

| Time | 4 Hours | 6 Hours | 8 Hours |
| --- | --- | --- | --- |
| Residual carbon concentration (ppm) | 380 | 410 | 410 |
| Bulk density (g/ml) | 0.76 | 0.77 | 0.78 |

Then, the treated powder obtained by the above operation was heat-treated under the following conditions using the same rotary kiln. After heating the first heater to 600° C., second heater to 700° C., the third heater to 850° C., the fourth heater to 1,000° C. and the fifth heater to 1,060° C., the powder was supplied at a rate of 5 kg/hr and air at a rate of 1,000 l/hr from the supply inlet, while rotating the core barrel at 4 rpm. The synthetic quartz powders discharged upon expiration of 4, 6 and 8 hours after initiation of the supply operation, were analyzed and found to have the values shown in Table 2.

TABLE 2

| Time | 4 Hours | 6 Hours | 8 Hours |
| --- | --- | --- | --- |
| Residual carbon concentration (ppm) | <5 | <5 | <5 |
| Bulk density (g/ml) | 1.07 | 1.06 | 1.07 |
| Number of black particles (number/10 g) | 0 | 0 | 0 |

Baking 60 g of the synthetic quartz powder obtained by the heat treatment, was charged into a quartz crucible having a diameter of 560 mm and heated in an electric furnace for baking. The furnace was heated at a temperature-raising rate of 240° C./hr to a temperature of 1,200° C., whereupon it was maintained at the same temperature for 60 hours. During this time, clean dry air having a dew point of −50° C. was circulated to the upper portion of the crucible at a rate of 1,900 l/hr. After completion of the maintenance, the heating was stopped, followed by cooling to room temperature. During the cooling, clean air was circulated. The synthetic quartz powder obtained after the baking was 59 kg. The obtained synthetic quartz powder was analyzed with respect to each sampling location and found to have the values shown in Table 3.

TABLE 3

| Sampling location in the crucible | Top• center | Top• near wall | Middle• center |
| --- | --- | --- | --- |
| Residual carbon concentration (ppm) | <5 | <5 | <5 |
| Bulk density (g/ml) | 1.12 | 1.13 | 1.11 |
| Silanol concentration (ppm) | 35 | 33 | 37 |

Shaping

The synthetic quartz powder obtained by baking, was shaped into an ingot by a Verneuil's method, with respect to each sampling location. No formation of bubbles was observed in the ingot.

Comparative Example 1

60 kg of the dry silica powder obtained by "Preparation of a dry silica gel powder" in Example 1, was charged into a crucible directly i.e. without applying heat treatment, and heated in an electric furnace to carry out the baking in the same manner as "Baking" in Example 1. The synthetic quartz powder thus obtained was 47 kg. This synthetic quartz powder was analyzed with respect to each sampling location and found to have the values shown in Table 4.

This synthetic quartz powder was shaped into an ingot by a Verneuil's method with respect to each sampling location. The bubble-forming state in the ingot is shown in Table 4.

TABLE 4

| Sampling location in the crucible | Top• center | Top• near wall | Middle• center |
| --- | --- | --- | --- |
| Residual carbon concentration (ppm) | <5 | <5 | <5 |
| Bulk density (g/ml) | 1.12 | 1.13 | 1.11 |
| Silanol concentration (ppm) | 52 | 50 | 60 |
| Bubble-foaming state in the shaped ingot | Almost nil | Almost nil | Bubbles observed |

Example 2

Using the same rotary kiln as used in Example 1, the gel obtained by "Preparation of a dry silica gel powder" in Example 1, was heat-treated by the following method.

The rotary kiln was set so that the maximum layer height of the dry silica gel powder supplied into the core barrel would be 80 mm. Further, the core barrel was adjusted so that its angle of inclination was 0.5°.

The heat treatment was carried out by firstly heating each heater to 500° C. and supplying the dry silica gel powder at a rate of 9.3 kg/hr and air at a rate of 6,780 l/hr from the supply inlet while rotating the core barrel at 4 rpm. The powder in the core barrel was continuously flowing all the time. The powders discharged upon expiration of 4, 6 and 8 hours after initiation of the supply operation, were analyzed and found to have the values shown in Table 5.

TABLE 5

| Time | 4 Hours | 6 Hours | 8 Hours |
| --- | --- | --- | --- |
| Residual carbon concentration (ppm) | 410 | 460 | 480 |
| Bulk density (g/ml) | 0.77 | 0.78 | 0.77 |

Then, the powder obtained by the above operation was further heat-treated under the following conditions using the same rotary kiln. After heating the first heater to 600° C., the second heater to 700° C., the third heater to 850° C., the fourth heater to 1,000° C. and the fifth heater to 1,060° C., the powder was supplied at a rate of 6.5 kg/hr and air at a rate of 1,000 l/hr from the supply inlet, while rotating the core barrel at 4 rpm.

During the above heat treatment, the powder in the core barrel was continuously flowing all the time.

The synthetic quartz powders discharged upon expiration of 4, 6 and 8 hours after initiation of the supply operation, were analyzed and found to have the values shown in Table 6. The number of black particles is the number of those visually confirmed to be black points when 10 g of the product was uniformly spread in a thickness of about 1 mm in a Petri dish.

TABLE 6

| Time | 4 Hours | 6 Hours | 8 Hours |
| --- | --- | --- | --- |
| Residual carbon concentration (ppm) | <5 | <5 | <5 |
| Bulk density (g/ml) | 1.06 | 1.07 | 1.06 |
| Number of black particles (number/10 g) | 0 | 0 | 0 |

Baking 60 kg of the synthetic quartz powder obtained by the above heat treatment was charged into a quartz crucible having a diameter of 560 mm and heated in an electric furnace for baking. The furnace was heated at a temperature raising rate of 240° C./hr to a temperature of 1,200° C., whereupon it was maintained at the same temperature for 60 hours. During the period, clean dry air having a dew point of −50° C. was circulated at a rate of 1,900 l/hr. After completion of the maintenance, the heating was stopped, followed by cooling to room temperature. During the cooling, clean air was circulated. The synthetic quartz powder obtained after the baking was 58 kg. The obtained synthetic quartz powder was analyzed with respect to each sampling location and found to have the values shown in Table 3.

TABLE 7

| Sampling location in the crucible | Top• center | Top• near wall | Middle• center |
| --- | --- | --- | --- |
| Residual carbon concentratipn (ppm) | <5 | <5 | <5 |
| Bulk density (g/ml) | 1.13 | 1.13 | 1.12 |
| Silanol concentration (ppm) | 39 | 37 | 43 |

Shaping

The synthetic quartz powder obtained by the baking, was shaped into an ingot by a Verneuil's method with respect to each sampling location. No formation of bubbles was observed in the ingot.

Comparative Example 2

Heat treatment of the dry silica gel powder obtained by "Preparation of a silica gel powder" in Example 1, was carried out using the same rotary kiln as used in Example 1 except that the doughnut-shaped dam opening diameter of the discharge outlet was changed to a size of 60 mm, and the maximum layer height was set to be 70 mm.

The powders discharged upon expiration of 4, 6 and 8 hours after initiation of the supply, were analyzed and found to have the values shown in Table 8.

TABLE 8

| Time | 4 Hours | 6 Hours | 8 Hours |
| --- | --- | --- | --- |
| Residual carbon concentration (ppm) | 400 | 750 | 300 |
| Bulk density (g/ml) | 0.77 | 0.76 | 0.78 |

Then, using a rotary kiln wherein the doughnut-shaped dam opening diameter of the discharge outlet was likewise set to be 60 mm, and the maximum layer height was set to be 70 mm, the powder obtained in the above operation was further heat-treated under the following conditions. After heating the first heater to 600° C., the second heater to 700° C., the third heater to 850° C., the fourth heater to 1,000° C. and the fifth heater to 1,060° C., the powder was supplied at a rate of 6.5 kg/hr and air at a rate of 1,000 l/hr from the supply inlet, while rotating the core barrel at 4 rpm.

Of the powder in the core barrel, the latter half was continuously flowing all the time, but the front half flowed intermittently, and generation of gas more than usual was observed during the transition from the static state to the flowing state.

The synthetic quartz powders discharged upon expiration of 4, 6 and 8 hours after initiation of the supply operation, were analyzed and found to have the values shown in Table 9.

TABLE 9

| Time | 4 Hours | 6 Hours | 8 Hours |
| --- | --- | --- | --- |
| Residual carbon concentration (ppm) | <5 | <5 | <5 |
| Bulk density (g/ml) | 1.13 | 1.12 | 1.13 |
| Number of black particles (number/10 g) | 2 | 1 | 1 |

Example 3

Using the dry silica gel powder obtained by "Preparation of a dry silica gel powder" in Example 1, the same "Heat treatment" as in Example 2 was carried out by employing the same rotary kiln as used in Example 1 except that the inner diameter of the barrel was 400 mm.

The powder in the core barrel was continuously flowing all the time. The synthetic quartz powder obtained by the heat treatment, was baked in the same manner as in "Baking" in Example 2, and the synthetic quartz powder after the baking, was shaped into an ingot in the same manner as the "Shaping" in Example 2. In each ingot, no formation of bubbles was observed.

Comparative Example 3

The same operation as in Comparative Example 2 was carried out except that heat treatment was carried out by employing the same rotary kiln as used in Example 2 except that the inner diameter of the barrel was 400 mm, whereby in the heat treatment, of the powder in the core barrel, the latter half was continuously flowing all the time, but the front half flowed intermittently, and generation of gas more than usual was observed during the transition from the static state to the flowing state, thus indicating the same state as in Comparative Example 2.

Example 4

Using the dry silica gel powder obtained by "Preparation of a dry silica gel powder" in Example 1, the following heat treatment was carried out by employing the same rotary kiln as used in Example 1. The rotary kiln had a size such that the doughnut-shaped dam opening diameter of the supply inlet was 20 mm, and the doughnut-shaped dam opening size of the discharge outlet was 40 mm, and the maximum layer height was set to be 80 mm. Further, the core barrel was adjusted so that its angle of inclination was 0.2°.

Heat treatment

Firstly, heaters were heated (first heater: 330° C., second heater: 330° C., third heater: 455° C., fourth heater: 455° C., fifth heater: 455° C.), and the powdery dry silica gel was supplied at a rate of 11 kg/hr and air at a rate of 100 l/min from the supply inlet, while rotating the core barrel at 8 rpm.

The powder in the core barrel was continuously flowing all the time.

The temperature of the powder at each heating zone was such that first heat zone: 110° C., second heater zone: 135° C., third heater zone: 265° C., fourth heater zone: 433° C., and fifth heater zone: 464° C.

The amount of gas generated in the zone where the powder temperature was 300° C. or lower was 310 N-l/kg-hr. Further, the length of the zone where the powder temperature was from 300 to 430° C., was 30 cm. Further, the time for passing through the zone where the powder temperature was from 450 to 464° C., was 0.6 hour. Then, the powders discharged upon expiration of 4, 6 and 8 hours after initiation of the supply operation, were analyzed and found to have the values shown in Table 10.

TABLE 10

| Time | 4 Hours | 6 Hours | 8 Hours |
| --- | --- | --- | --- |
| Residual carbon concentration (ppm) | 980 | 1,100 | 1,000 |
| Bulk density (g/ml) | 0.85 | 0.83 | 0.83 |

As is evident from Table 10, the analyzed values of the powders were constant.

Then, the powder obtained by the above operation was heat-treated under the following conditions using the same rotary kiln. After heating the first heater to 500° C., the second heater to 750° C., the third heater to 750° C., the fourth heater to 1,000° C. and the fifth heater to 1,030° C., the powder was supplied at a rate of 9.2 kg/hr and air at a rate of 110 l/min from the supply inlet, while rotating the core barrel at 8 rpm.

The final temperature of the powder during the heat treatment was 1,020° C.

The powder in the core barrel was continuously flowing all the time.

The synthetic quartz powders discharged upon expiration of 4, 6 and 8 hours after initiation of the supply operation, were analyzed and found to have the values shown in Table 11.

TABLE 11

| Time | 4 Hours | 6 Hours | 8 Hours |
| --- | --- | --- | --- |
| Residual carbon concentration (ppm) | <5 | <5 | <5 |
| Bulk density (g/ml) | 1.1 | 1.2 | 1.2 |
| Number of black particles (number/10 g) | 0 | 0 | 0 |

Baking 130 g of the synthetic quartz powder obtained by the heat treatment, was charged into a quartz crucible having a diameter of 550 mm and heated in an electric furnace for baking. The furnace was heated at a temperature-raising rate of 200° C./hr to a temperature of 1,200° C., whereupon it was maintained at the same temperature for 40 hours. During this period, clean dry air having a dew point of −60° C. was circulated to the crucible at a rate of 780 l/hr. After completion of the maintenance, the heating was stopped, followed by cooling to room temperature. Also during the cooling, clean dry air was circulated. The synthetic quartz powder obtained after the baking was 112 kg. The obtained synthetic quartz powder was analyzed with respect to every sampling location and found to have the values shown in Table 12.

TABLE 12

| Sampling location in the crucible | Top* center | Top* near wall | Middle* center |
| --- | --- | --- | --- |
| Residual carbon concentration (ppm) | <5 | <5 | <5 |
| Bulk density (g/ml) | 1.25 | 1.24 | 1.24 |
| Silanol concentration (ppm) | 45 | 45 | 60 |

Shaping

The synthetic quartz powder obtained by the baking was shaped into an ingot by a Verneuil's method with respect to each sampling location. No formation of bubbles was observed in the ingot.

Industrial Applicability

By the present invention, a synthetic quartz powder having a little content of residual carbon which causes formation of bubbles during melt forming, can be readily obtained.

What is claimed is:

1. A process for producing a synthetic quartz powder, which comprises a step of heat-treating a silica gel powder while permitting it to flow in a rotary kiln.

2. The process for producing a synthetic quartz powder according to claim 1, which comprises heat-treating the silica gel powder while continuously supplying it from one end of the rotary kiln.

3. The process for producing a synthetic quartz powder according to claim 1 or 2, wherein the silica gel powder has a maximum layer height in the rotary kiln of at least 75 mm.

4. The process for producing a synthetic quartz powder according to claim 1, wherein the rotary kiln has one or more zones in an axial direction of the kiln, and heat-treating is carried out so that the time for passing through a zone in the rotary kiln where the powder is at a temperature of from 450 to 550° C., is from 0.5 to 10 hours.

5. The process for producing a synthetic quartz powder according to claim 4, wherein heat supply is adjusted so that the length of a zone in the rotary kiln where the temperature of the powder is from 300 to 430° C., is at least 5 cm and at most 50 cm.

6. The process for producing a synthetic quartz powder according to claim 1, wherein the amount of a gas generated from the powder is at most 500 N-l/kg.hr.

7. The process for producing a synthetic quartz powder according to claim 1, wherein the the heat treatment is carried out at a final temperature of from 900 to 1,100° C.

8. The process for producing a synthetic quartz powder according to claim 1, wherein the heat treatment is carried out at a temperature of at most 1,100° C., and then baking is further carried out at a temperature exceeding 1,100° C.

9. The process for producing a synthetic quartz powder according to claim 1, wherein the rotary kiln has an angle of inclination of at most 3°.

10. The process for producing a synthetic quartz powder according to claim 1, which is carried out by means of a multistage rotary kiln.

11. The process for producing a synthetic quartz powder according to claim 1, wherein the rotary kiln contains a core barrel made of quartz.

12. The process for producing a synthetic quartz powder according to claim 1, wherein the silica gel powder is one obtained by hydrolysis of a tetraalkoxysilane.

13. The process for producing a synthetic quartz powder according to claim 1, wherein the rotary kiln has an axial direction, and a plurality of heaters are disposed in the axial direction of the rotary kiln so as to control heating intensity in the axial direction of the rotary kiln.

14. A process for producing a shaped product of quartz glass prepared by fusing a synthetic quartz powder which comprises a step of heat-treating a silica gel powder while permitting it to flow in a rotary kiln.

15. A process for producing a shaped product of quartz glass, which comprises heat-treating a silica gel powder while continuously supplying the silica gel powder from one end of a rotary kiln and permitting it to flow, to obtain a synthetic quartz powder, and further fusing the synthetic quartz powder.

16. A process for producing a shaped product of quartz glass, which comprises heat-treating a silica gel powder while permitting it to flow by means of a rotary kiln, in such a manner that the silica gel powder has a maximum layer height in the rotary kiln of at least 75 mm, to obtain a synthetic quartz powder, and further fusing the synthetic quartz powder.

* * * * *